(12) United States Patent  
Goode et al.

(10) Patent No.: US 8,763,053 B1  
(45) Date of Patent: Jun. 24, 2014

(54) FILE SYSTEM FOR A FILE SERVER OF A VIDEO-ON-DEMAND SYSTEM

(75) Inventors: Christopher W. B. Goode, Menlo Park, CA (US); Donald F. Gordon, Los Altos, CA (US); Geoff Cleary, Ambler, PA (US)

(73) Assignee: Cox Communications, Inc., Atlanta, GA (US)

( * ) Notice: Subject to any disclaimer, the term of this patent is extended or adjusted under 35 U.S.C. 154(b) by 867 days.

(21) Appl. No.: 09/540,177

(22) Filed: Mar. 31, 2000

Related U.S. Application Data (60) Provisional application No. 60/127,332, filed on Apr. 1, 1999.

(51) Int. Cl.  
*H04N 7/173* (2011.01)

(52) U.S. Cl.  
USPC ................................................ 725/92; 725/93

(58) Field of Classification Search  
USPC .............................. 725/87–103; 709/217–232  
See application file for complete search history.

(56) References Cited

U.S. PATENT DOCUMENTS

| | | | | |
|---|---|---|---|---|
| 5,253,275 A | * | 10/1993 | Yurt et al. | 375/240 |
| 5,473,362 A | | 12/1995 | Fitzgerald et al. | |
| 5,581,778 A | | 12/1996 | Chin et al. | 395/800 |
| 5,606,359 A | * | 2/1997 | Youden et al. | 725/88 |
| 5,627,935 A | * | 5/1997 | Kim | 386/263 |
| 5,671,377 A | * | 9/1997 | Bleidt et al. | 715/723 |
| 5,864,682 A | | 1/1999 | Porter et al. | |
| 5,928,327 A | * | 7/1999 | Wang et al. | 725/88 |
| 6,005,599 A | * | 12/1999 | Asai et al. | 725/116 |
| 6,058,236 A | * | 5/2000 | Peters et al. | 386/327 |
| 6,128,467 A | | 10/2000 | Rege | |
| 6,134,586 A | * | 10/2000 | Walker | 725/87 |
| 6,240,243 B1 | * | 5/2001 | Chen et al. | 386/344 |
| 6,327,421 B1 | * | 12/2001 | Tiwari et al. | 386/326 |
| 6,442,604 B2 | * | 8/2002 | Romine | 709/219 |
| 6,604,224 B1 | | 8/2003 | Armstrong et al. | |

FOREIGN PATENT DOCUMENTS

WO     WO 9613121 A1 * 5/1996

* cited by examiner

*Primary Examiner* — Annan Shang  
(74) *Attorney, Agent, or Firm* — Merchant & Gould (57) ABSTRACT

A file system that integrates trick play and standard play video information (movies or other video assets) into a single file. The single file for the video information contains a standard play track, a fast forward track, and a reverse play track that is striped onto a storage medium.

20 Claims, 4 Drawing Sheets

FILE SYSTEM FOR A FILE SERVER OF A VIDEO-ON-DEMAND SYSTEM

CROSS-REFERENCE TO RELATED APPLICATIONS

This application claims benefit to U.S. Provisional patent application Ser. No. 60/127,332, filed Apr. 1, 1999 and herein incorporated by reference.

BACKGROUND OF THE DISCLOSURE

1. Field of the Invention

The invention generally relates to a file system for a file server and, more particularly, relates to a file system for a file server of a video-on-demand system.

2. Description of the Background Art

In a video-on-demand (VOD) system such as a VOD system manufactured by DIVA Systems Corporation, a file server is used for streaming video information to users (subscribers) of the system. This system is described in U.S. Pat. No. 6,253,375, and the file server is described in U.S. Pat. Nos. 5,671,377 and 5,581,778. This system contains service provider equipment coupled through an information distribution network to subscriber equipment. This system provides subscribers VCR-like controls to enable a subscriber to select information content, for example, a movie, then play, fast forward, rewind, pause, or stop the selected movie. The subscriber enters control commands through the subscriber equipment and the service provider equipment executes the commands to fulfill the purpose of the command, e.g., play, fast forward, reverse play, stop or pause the movie.

The file server forms a portion of the service provider equipment and stores, for a given movie, a standard play track (i.e., an MPEG-2 compressed video bitstream), a fast forward track and a reverse play track. For a pleasing user presentation, the fast forward and reverse play tracks are also MPEG-2 compressed video, where the fast forward track is a compressed signal containing only every Nth frame of the uncompressed play video and the reverse play track is a compressed signal containing every Nth frame of the uncompressed play video played backwards. For optimal access bandwidths, the video information, each track is segmented into extents (e.g., N-bytes of compressed data) and stored onto sequential disk drives on the server in a process known as striping.

Each track forms a separate file within the directory structure of the file server. As such, when a subscriber selects a particular movie to view, the file server scans its directory structure to find the location of the movie and begins sending (streaming) the movie to the subscriber. Streaming of the video bitstream is accomplished by sequentially recalling each extent (N-byte segment) of the compressed movie from the disk array in the order that the movie was stored. If the subscriber selects fast forward mode, since the fast forward track is stored as a separate file, the directory must obtain information as to the beginning location of the fast forward file within the disk array and, using the duration of the movie that has played thus far, compute an offset to the relative position in the fast forward stream. Using the relative position, the directory can identify the portion of the fast forward stream to begin retrieving to provide a fast forward "look and feel" to the subscriber. A similar process is performed every time the reverse play mode is entered.

When a user transitions from one file to another, a substantial amount of processing is required that causes extended latency before the new file is properly accessed and transmitted to a user. The latency between the time a user requests a particular file and when the file is accessed at the correct location within the file can have a long duration. Such extensive latency detracts from the VCR-like "look and feel" of the system's operation.

Within the VOD system, the majority of the movies are stored in a secondary storage that has a relatively slow access time. To allow immediate access to movies stored on the secondary storage, an initial portion of a movie (known as a leader track) is stored on the disk array of the VOD system. When a movie is requested by a user, the leader track is played while a copy of the movie is retrieved from secondary storage. However, having each track stored as a separate file for a particular movie does not permit "leader tracks" to be used that would include fast forward or rewind functionality. As such, the leader tracks that are stored on the server and played to a user while the server retrieves the entire file from mass storage, generally only provide a play function. As such, until the full file is retrieved and stored, the user may only play the movie. Consequently, fast forwarding through, for example, the credits is not permitted.

Therefore, there is a need in the art for an improved file system for a video-on-demand system to simplify the file structure and the data retrieval process.

SUMMARY OF THE INVENTION

The invention provides a file system that integrates trick play track(s) (such as fast forward and fast reverse) and standard play track video information into a single file. As such, a portion of the play track and its associated trick play tracks are available together and leader tracks are unnecessary. The file data for each of the movies (or other video assets) are organized into logical segments to permit availability of related portions of all tracks and to allow the location in a trick play and standard play tracks to be readily identifiable from the present retrieval location within the overall file. Trick play tracks include various speeds of reverse play and fast forward compressed video data.

In the present invention, a movie is divided into extents containing video data and an extent descriptor comprising a movie identifier, an extent number, and a total extents number that identifies the total number of extents that comprise the track. The extents are stored in groups, e.g., four extents in a group, that forms a stripe group. The groups are striped across a disk array to form a stripe block.

In one embodiment of the file system of the present invention, "n" segments of the file data of a standard play track are striped across a disk array of a server. Each segment of the standard play track (comprising a plurality of stripe blocks of standard play track data) is immediately followed by one stripe block of fast forward track and then by one stripe block of the reverse play track. These tracks respectively represent the fast forward and fast rewind information for that portion of the standard play stream that was just striped onto the disk array. For example, if the ratio of fast forward or rewind to play information is nine to one, then nine stripe blocks of a standard play track (one segment) are stored and then one stripe block of fast forward and one stripe block of reverse play. In this manner, the "player" software of the file server can readily determine where in the fast forward or rewind track the information that relates to the present position in the play track is located, i.e., one-ninth of the position in the play track without reference to the file system data.

By using this file system format, a secondary storage system (e.g., a magneto-optical (MO) system) that supplies the information to the disk array can use a simplified file structure to enhance file transfer to the array. The information describing the linkage between the stripe data is stored on the MO platter. This information (extent map) can be stored as a prefix to the integrated file or as a separate file descriptor. Thus, a variety of "trick play" tracks can be associated with any standard track play or with any other track. For example, a thirty times (30x) track (a track that displays video at 30 times normal playback speed) could be directly associated with the play track and the extent map would identify it as a 30 times track as well as identify the amount of storage space occupied by the track. Thus, the file server can switch from a play track location to a location in an associated track using direct segment mapping and not a computationally intensive mapping algorithm. As such, a generalized algorithm within the file server can be used to manage all track playback. The standard play track can be associated with multiple trick play tracks without modifying the server software, over burdening the file system or complicating data retrieval or archival. Also, by integrating the play and trick play tracks, trick play functionality is available at all times while retrieving a movie from the secondary storage.

In an alternative embodiment of the invention, the extents for the stripe block formatted file can be embedded in the file descriptor for the file. The extent information can be explicitly recited in the file descriptor, or the extent information can be computed from the file descriptor information, i.e., the total length of the file, the number of stripe groups, the number and type of trick play tracks. Since the file structure is well defined, the correct location within a trick play track relative to the present position in a currently playing track, is rather simple. The relationship is linear such that the position in the current track is linearly related to that position in a trick play track.

In another embodiment, multiple programs are multiplexed into striped group containing play tracks and trick play tracks. This form of storage is especially useful for real-time storage of digitized off-the-air programs.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
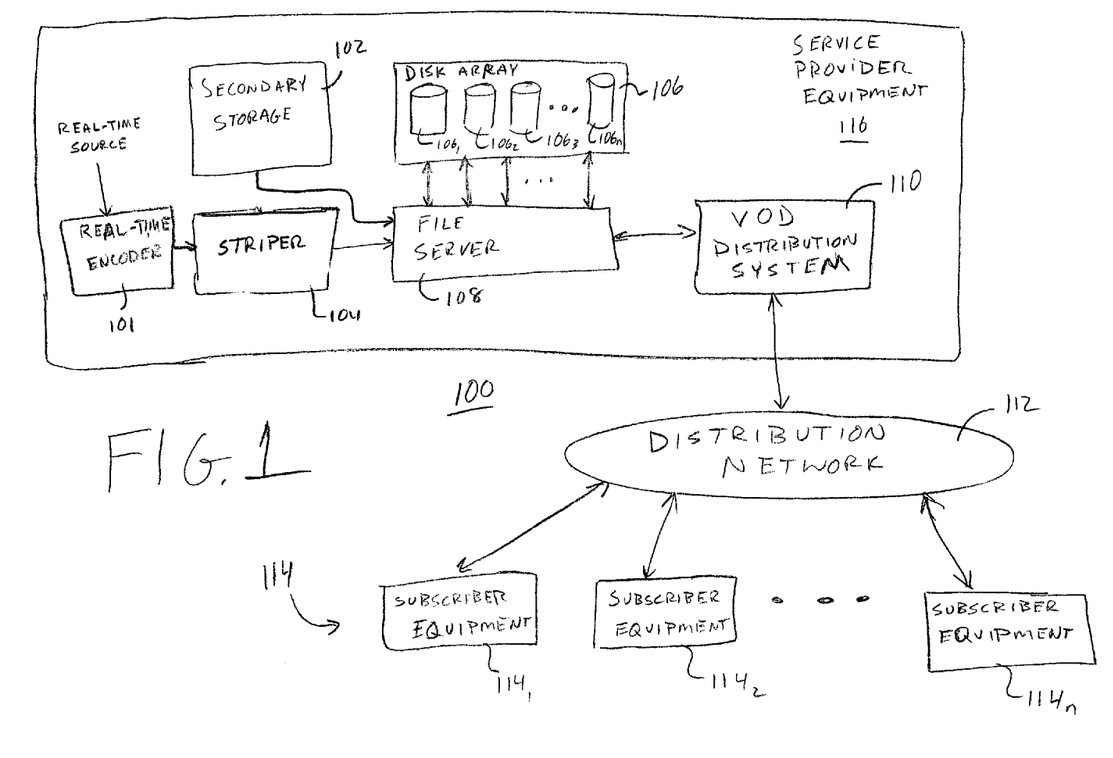
FIG. 1 depicts a block diagram of a video-on-demand system that uses the file system of the present invention.

FIG. 1 depicts a simplified block diagram of a video-on-demand (VOD) system 100 that uses the present invention of an improved file system for a file server 108. The system 100 contains a secondary storage 102, a striper 104, a real-time encoder 101, a file server 108, a disk array 106 containing a plurality of disks $106_1$, $106_2$, ... $106_n$, a VOD distribution system 110, a distribution network 112, subscriber equipment $114_1$, $114_2$, ... $114_n$ (collectively 114). The system 100 generally operates as described In commonly assigned U.S. Pat. No. 6,253,375, and incorporated herein by reference. In short, a subscriber is able, through an interactive menu structure, to select certain video information (e.g., movies) to be transmitted from the service provider equipment 116, through the distribution network 112, to the subscriber's home equipment 114, where the video information is decoded and played for viewing. The video information is stored and transmitted in compressed form (e.g., using MPEG-2 compression) such that the subscriber equipment decodes the compressed information for display. Through interaction with the subscriber equipment 114, the subscriber can use VCR-like functions to fast forward and rewind (reverse play) the video information being displayed.

The compressed information is stored on a disk array 106 and accessed by a file server 108. Additional source material (e.g., other movies) is stored on secondary storage 102 and supplied to the disk array 106 through the file server 108. The secondary storage 102 is generally a magneto-optical (MO) storage system that retains the video information in compressed form. The secondary storage could also be in the form of a content server or network of servers. The compressed information is coupled to the file server 108 to be striped across the disk array 106 such that data redundancy efforts and storage access is enhanced. Additionally, content for the file server 108 can be optionally produced in real-time by a real time video encoder 101 that simultaneously produces a compressed play track and trick tracks for a real-time video program. Storage and retrieval of data on a file server 108 having a parallel processing structure is described in U.S. Pat. Nos. 5,671,377 and 5,581,778, both of which are incorporated herein by reference.

In accordance with the present invention, data is striped from the secondary storage 102 or from the real-time encoder 101 onto the disk array 106 using a stripe group format. The secondary storage 102 contains data that is generally organized to facilitate striping onto the array. As such, in one embodiment of the invention, information is stored on the secondary storage 102 such that the extent mapping information is transferred to the disk array just prior to the video data. The video data is organized by "track" type, i.e., standard play, fast forward, or reverse play. Other types may be included such as super fast (30x) fast forward or super fast rewind and the like. In another embodiment of the invention, the extent information is either stored in or derived from information contained in the file descriptor.

The file that is stored in the array is an image of the file stored in secondary storage. The dynamic links to the information are updated as the file is stored in the array to ensure that the file can be retrieved from the array. However, for real-time encoded files, the files are supplied separately, i.e., in track format, and the striper 104 interleaves the track formats in accordance with the invention such that play and trick play portions of the files are correctly interleaved and grouped as discussed below with respect to FIG. 4.

Figure 2:
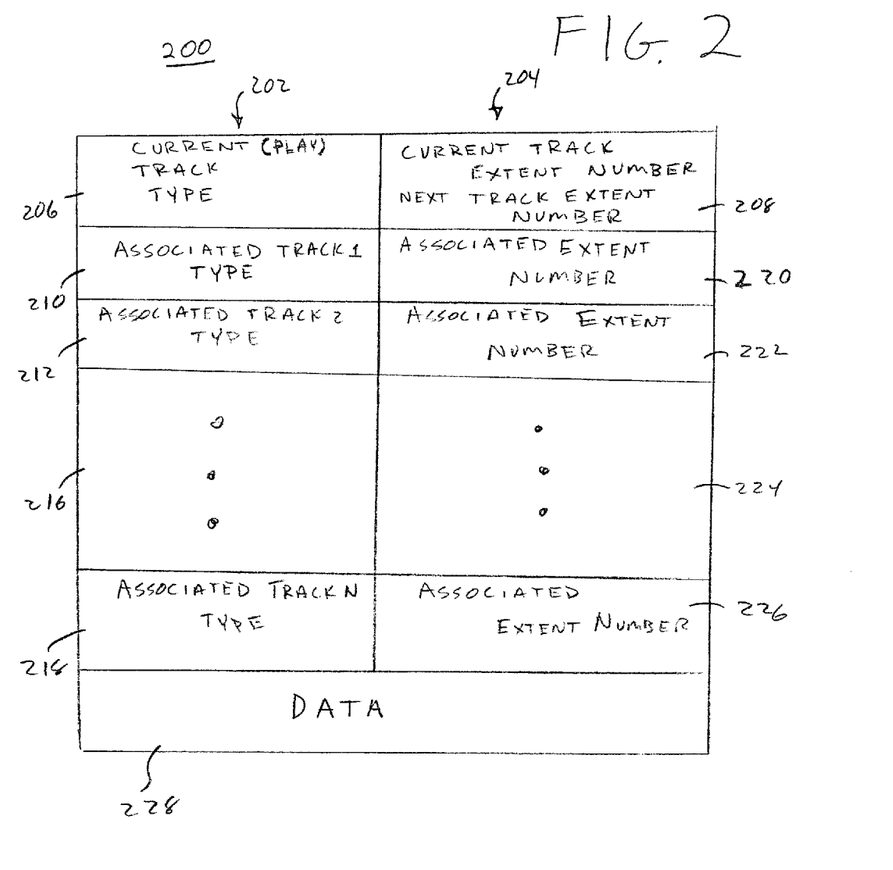
FIG. 2 depicts an extent map for the file system of the present invention.

FIG. 2 depicts an extent map 200 for the file system of the present invention. The extent map 200 contains a plurality of track type fields 202 and a plurality of extents 204 associated with each track type. The first track type field 206 contains the current track type, i.e., a standard play track. Its associated extent field 208 contains the extent number of the track identified in field 206 and the next extent number of the current track. Track type fields 210, 212, 214 and so on identify the track types that are associated with the track type (e.g., a standard play track) identified in field 206. These associated track types are generally the fast forward and rewind track types. With each track type field is an associated extent number field 220, 222, 224, 226 and so on that identifies the extent of each of the associated track types. The extent field may contain the true extent of the data in the trick play track or a relative extent value that is relative to the current track type extent, or both. The disk data for the current extent resides in region 228. As such, when information is stored in the disk array, the extent map 200 is stored first, followed by the data associated with the tracks identified in the map 200.

Alternatively, the extent information can be embedded into a file descriptor for the data file that contains the standard play and trick play data. The file descriptor contains file content identification information as well as a list of track types contained in the file. The extent number of each track could also be explicitly recited in the file descriptor, but to reduce the file descriptor size, the extent information can be easily computed due to the logical arrangement of the data. Since the number of stripe blocks used to store a segment of standard play video is predefined and directly related to the rate of the trick play track, computing a location in a trick play track that corresponds with a standard play track location is trivial, i.e., a solution to linear equation.

For example, if the fast forward and rewind tracks are nine times faster than the standard play track, and the rewind track is reverse mapped onto the array, and the stripe block size is n extents, then a pseudocode representation of a routine to find the extents in a file is:

PLAY EXTENT
   If current_extent rem stripe_block=0

Current_extent=current_extent+stripe_size*2;

Else
      ++current_extent

FAST FORWARD EXTENT ff_extent=((current_extent rem(11*stripe_size))
         *9*stripe_block)+(current_extent rem(11*stripe_size))

REWIND EXTENT rw_extent=((current_extent rem(11*stripe_size))
         *9*stripe_block)-(current_extent rem(11*stripe_size))

Figure 3:
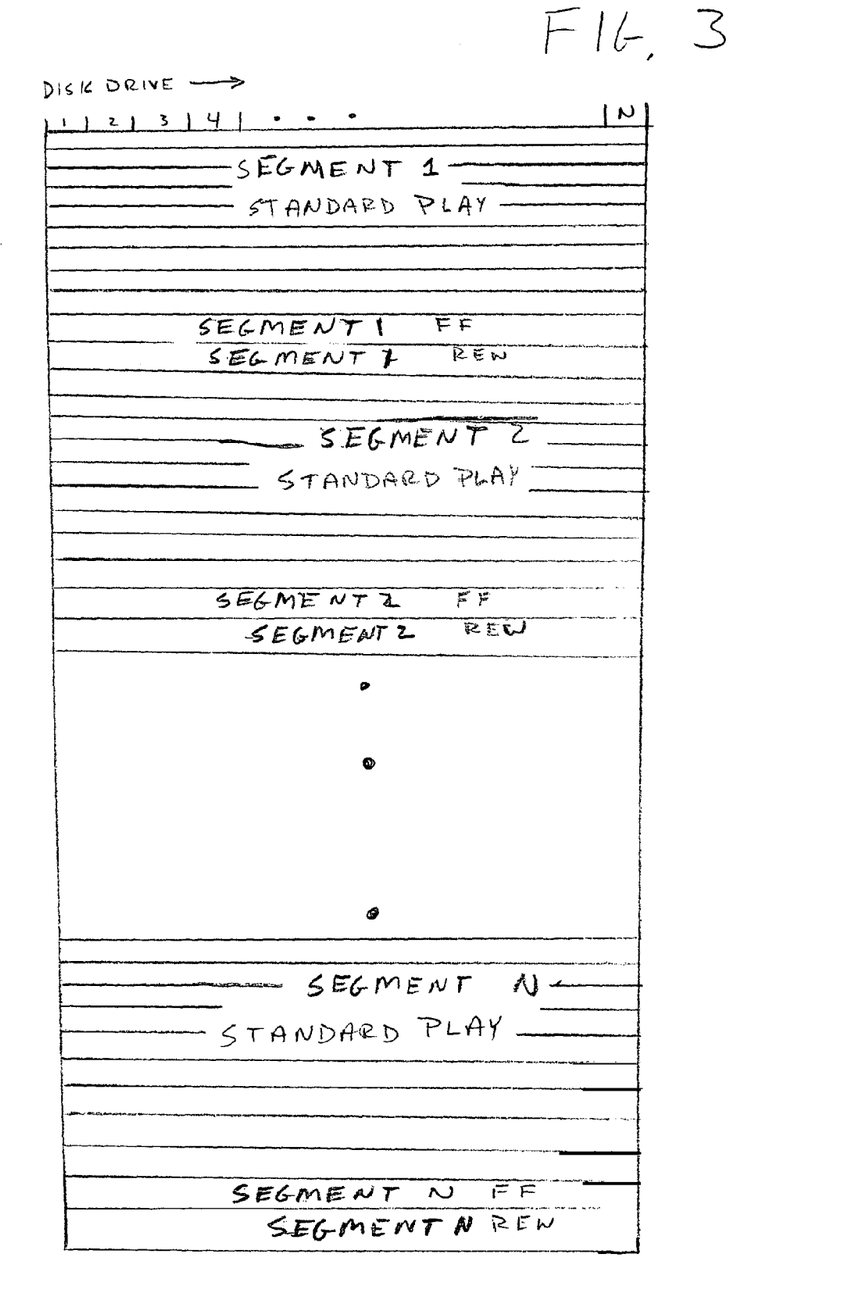
FIG. 3 illustrates a stripe block file structure.

As depicted in FIG. 3, the data is striped across the entire disk array from left to right. As depicted, the stripe block is N disks wide, where N is an integer. The standard play data is first striped across the array, then the associated tracks such as, for example, fast forward and fast rewind. If the fast forward and rewind tracks run at nine times the standard play track, then nine stripe blocks of standard play data are stored as segment 1 standard play followed by a stripe block of fast forward data and a stripe block of rewind data for segment 1. Then, nine more blocks of standard play data (segment 2) is stored followed by stripe blocks of its associated tricks tracks. This pattern of stripe block storage is used until an entire movie is stored, then the next movie is stored in the same manner and so on.

Using the extent map 200 in conjunction with the stripe block file structure 300, makes the transition from standard play mode to fast forward or reverse play a trivial exercise without a need for a mapping algorithm. The location in the stripe block standard play track is directly correlated to a location in the associated tracks.

In this manner, a single file is used to store the entirety of a video asset and all its associated tracks. Using an extent map to identify tracks, an unlimited number of tracks can be associated with a given standard play file. The linkages between the tracks is defined by the extent map and not algorithmically, thus transitioning from track to track is not computationally intensive.

When storing files produced by the real time encoder, i.e., files representing "time shifted" programming, the newly generated files need to be interleaved and striped onto the server's disk array as rapidly as possible. With rapid storage, the "trick play" features are available to the user as soon as the user begins viewing a "live" program. As such, the user can reverse the program to review, for example, a recent play in a sporting event and then fast forward back to the "live program".

This latency for a five board (300 data processors) server is approximately 191 seconds. This latency is the time required to collect sufficient real-time data to fill one stripe block. Given the extent linking proposed above, it is possible to reduce this latency to about 3.2 seconds, i.e., the time needed to fill one stripe group of 4 processors.

In order to eliminate the latency, the improved format stores data from multiple video programs concurrently into each stripe block. As such, the extent descriptor block is extended to support the file identity through a program identification (PID) association field, e.g., a unique identification field, that contains PIDS for related programs such that the trick play tracks are associated with the standard play tracks. The field may also be used to identify the various programs that are stored in a single stripe block.

In constructing the stripe blocks, it may be necessary to have some stripe groups where no data is written to ensure that subsequent stripe groups receive contiguous data over two stripe blocks.

When looking at the number of parallel retrievals supported by this mechanism, the key requirement is the remaining ahead of real time. Thus the parameters are the maximum retrieval rate for the server and the number of output video streams to be dedicated to this function. With a 5-board server there are 60 processor groups, thus the maximum number of parallel streams is 60. This equates to an average retrieval rate of:

$$11*336{,}144*5*48/9*1024*1024*3.2 = 264 \text{ MB/s}$$

However, in practical terms, there is a trade-off between retrieval rate and latency, thus for example if an acceptable latency is 10 seconds then the retrieval rate becomes 88 MB/s. Further reduction will require a change in the retrieval mechanism to address groups less than the complete stripe group.

To further minimize the time shifting penalty, it is necessary to reduce the latency to the availability of the fast play and fast reverse play tracks. In time shifting, these tracks can only be generated when a sufficient amount of the associated play track has been received. To minimize the time shift between off-air and recorded play back, the play track is being written to the server as fast as it is received by the server. To minimize the delay to FF and FR, these tracks are generated on a stripe group basis. Thus, for a single processor board (i.e., 12 processors) and four parallel video programs being stored simultaneously, one example of the ordering of extent striping is shown in FIG. 4.

Figure 4:
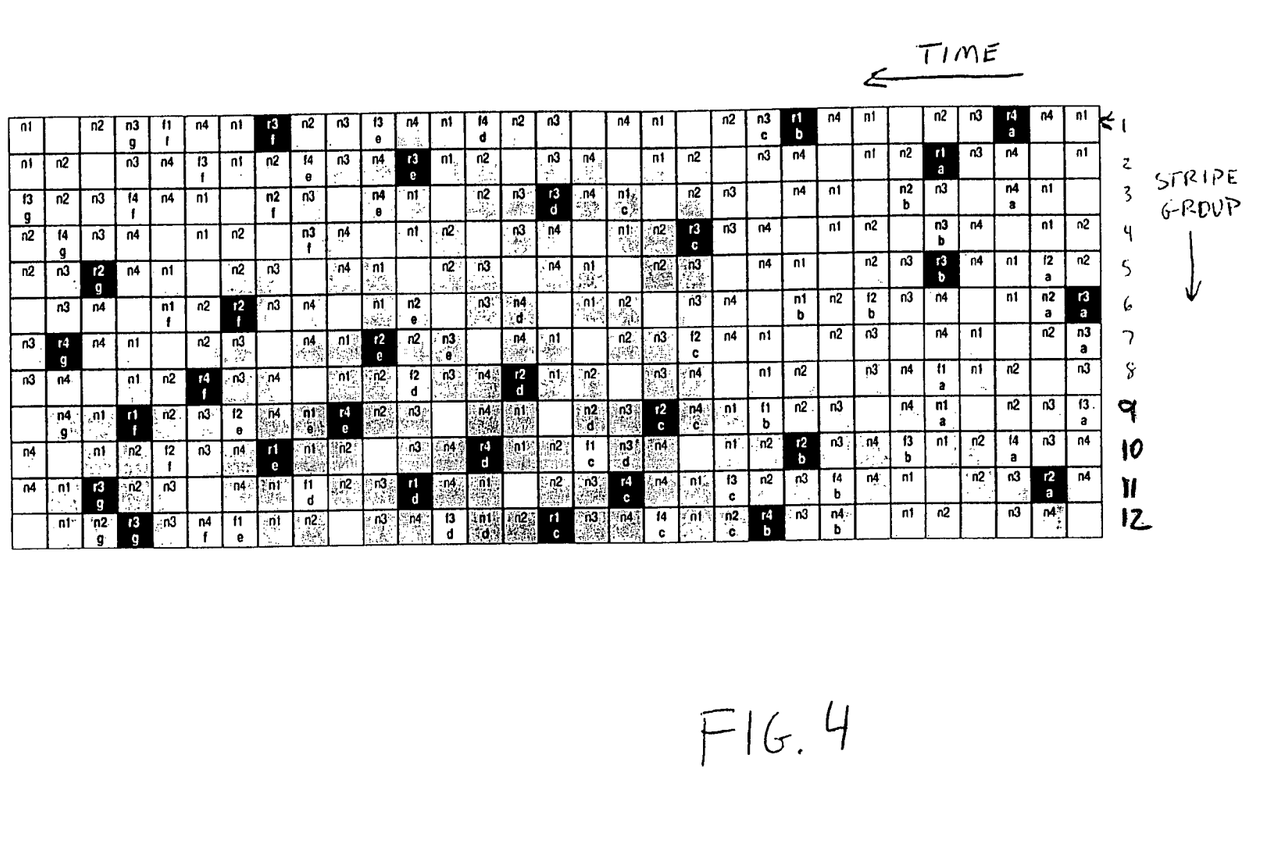
FIG. 4 depicts a stripe group multiplexed file structure.

In FIG. 4, the horizontal axis represents time starting on the right side and the vertical axis represents a stripe group number e.g., 1 through 12. In this embodiment, one stripe group is 4 disk drives wide and is represented as one square in the figure. The play data of each stripe group is represented by four different nomenclature values (i.e., n1, n2, n3, and n4). The fast forward and rewind data is identified as fx and rx, where x is the associated play program 1-4. The white squares represent unused bandwidth.

As shown in FIG. 4, the nomenclature n1 is the extent group of normal play track 1. A block labeled "n1" and "a" is also the extent group for normal track 1, while "a" denotes the availability of sufficient material to output the first groups of fast forward and rewind material, if requested by a user. The next such availability is marked with a "b". A block identified with "r1" and "a" is the extent group for a rewind track corresponding to track n1. The "a" denotes that the group was available at the time the normal group "n1/a" was available. Similarly, the blocks labeled f1/a comprise the extent group for a fast forward track corresponding to track 1. The "a" again denoted that the group was available at the time that the normal group n1/a was available. In this manner, four programs are striped in real time onto the disk array with corresponding fast forward and rewind tracks stored as soon as enough data is available to create these trick play tracks. Once created, a user is provided the full capability of the system to access both play and trick play tracks.

Although various embodiments which incorporate the teachings of the present invention have been shown and described in detail herein, those skilled in the art can readily devise many other varied embodiments that still incorporate these teachings.

What is claimed is:

1. A method for integrating standard play tracks and trick play tracks into a single file, comprising:
   dividing a video into a plurality of extents;
   generating an extent map identifying video data and extent descriptors associated with each of the plurality of extents, each of the extent descriptors including a video identifier, an extent number, and a total number of extents that comprise the video;
   grouping the plurality of extents in groups of four to form a plurality of stripe groups, the plurality of stripe groups forming stripe blocks when stripped across a disk array; and
   storing each of the stripe blocks into a plurality of segments of video information, each of the plurality of segments including:
      a first number of standard play tracks comprising a plurality of stripe blocks of standard play track data, the standard play tracks having a standard play rate,
      a second number of trick play tracks, the first number of the standard play tracks and the second number of the trick play tracks defining a ratio of the standard play rate to a trick play rate such that the trick play rate is greater than the standard play rate, the ratio also being the ratio of the plurality of stripe blocks of standard play track data to stripe blocks of trick play track data,
      each segment of standard play blocks and trick play blocks is striped across a disk array before another segment is striped across the disk array.

2. The method of claim 1 wherein the trick play track data comprises at least one of a fast forward track and a fast reverse track.

3. The method of claim 1 further comprising an extent map that identifies extents of the stripe group standard play video data and the trick play track data as associated tracks within the single file.

4. The method of claim 1 wherein a stripe block comprises the plurality of stripe groups.

5. The method of claim 4 wherein said plurality of stripe groups are stored simultaneously.

6. The method of claim 1 wherein the ratio of the first number to the second number is linearly related to the ratio of the trick play rate to the standard play rate.

7. The method of claim 1, wherein the stripe blocks of trick play video data comprise a specific track of trick play video having a specific trick play rate, and wherein the ratio of the first number to the second number for a specific track is equal to the ratio of the specific trick play rate to the standard play rate.

8. A method for integrating standard play tracks and trick play tracks into a single file, comprising:
   storing an extent map identifying a plurality of extents, each of the plurality of extents being associated with an extent descriptor and a play track or a trick play track, each extent descriptor including a video identifier, an extent number, and a total number of extents that comprise a video;
   storing a plurality of segments in the single file, each of the plurality of segments is striped across a disk array before a next segment is striped across the disk array, each of the segments including:
      a first number of standard play tracks comprising a plurality of stripe blocks of standard play track data, the standard play tracks having a standard play rate, and
      a second number of trick play tracks, the first number of the standard play tracks and the second number of the trick play tracks defining a ratio of the standard play rate to a trick play rate such that the trick play rate is greater than the standard play rate.

9. The method of claim 8 wherein the trick play video data comprises at least one of a fast forward track and a fast reverse track.

10. The method of claim 8 further comprising the extent map that identifies extents of the stripe group standard play video data and the trick play video data as associated tracks within the single file.

11. The method of claim 8 further comprising a file descriptor containing extent information for each stripe block.

12. The method of claim 8 wherein a stripe block comprises a plurality of stripe groups.

13. The method of claim 12 wherein said plurality of stripe groups are stored simultaneously.

14. The method of claim 8 wherein the ratio of the first number to the second number is linearly related to the ratio of the trick play rate to the standard play rate.

15. The method of claim 8, wherein the stripe blocks of trick play video data comprise a specific track of trick play video having a specific trick play rate, and wherein the ratio of the first number to the second number for a specific track is equal to the ratio of the specific trick play rate to the standard play rate.

16. A system to provide a video including standard play tracks and trick play tracks, comprising:
   a file server that includes a single file comprising a video asset associated with the video, the video asset comprising:
      an extent map identifying a plurality of extents, each of the plurality of extents, each of the plurality of extents being associated with a portion of the video asset and an extent descriptor, each extent descriptor including a video identifier, an extent number, and a total number of extents that comprise the video;
      a plurality of segments of video information, each segment comprising:
         a first number of standard play tracks comprising a plurality of stripe blocks of standard play track data, the standard play tracks having a standard play rate, and
         a second number of trick play tracks, the first number of the standard play tracks and the second number of the trick play tracks defining a ratio of the standard play rate to a trick play rate such that the trick play rate is greater than the standard play rate,
         each segment of standard play blocks and trick play blocks is striped across a disk array before another segment is striped across the disk array.

17. The system of claim 16 wherein the single file comprises the extent map for locating video information within the single file.

18. The system of claim 17 wherein the single file and the extent map are stored on a secondary storage.

19. The system of claim 16 wherein a VOD distribution system comprises the disk array.

20. The system of claim 16 wherein information for locating positions in the trick play tracks relative to the standard play tracks is contained in a file descriptor.

* * * * *

UNITED STATES PATENT AND TRADEMARK OFFICE
CERTIFICATE OF CORRECTION

| | | |
|---|---|---|
| PATENT NO. | : 8,763,053 B1 | Page 1 of 1 |
| APPLICATION NO. | : 09/540177 | |
| DATED | : June 24, 2014 | |
| INVENTOR(S) | : Goode et al. | |

It is certified that error appears in the above-identified patent and that said Letters Patent is hereby corrected as shown below:

IN THE CLAIMS:

Col. 7, line 28, claim 1: "stripped across a disk array;" should read --striped across a disk array;--

Signed and Sealed this
Twentieth Day of January, 2015

Michelle K. Lee
*Deputy Director of the United States Patent and Trademark Office*